Oct. 22, 1946.   A. V. JANIEWSKI   2,409,763
AIRCRAFT LAUNCHING MEANS
Filed May 7, 1945   4 Sheets-Sheet 2

Inventor
ANDREW VERNON JANIEWSKI

By Edward M Fisher
Attorney

Oct. 22, 1946.    A. V. JANIEWSKI    2,409,763
AIRCRAFT LAUNCHING MEANS
Filed May 7, 1945    4 Sheets-Sheet 3
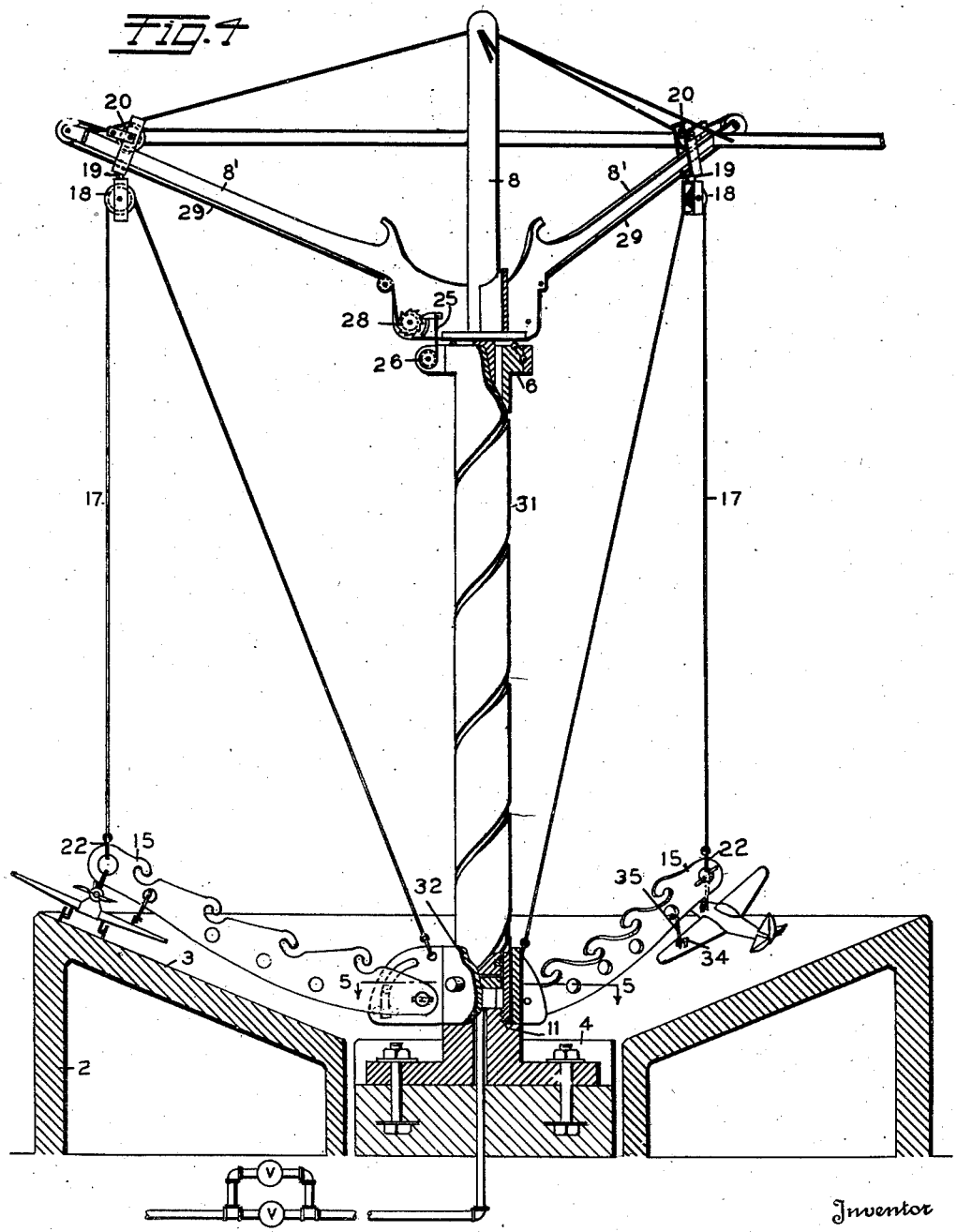
Inventor
ANDREW VERNON JANIEWSKI
By Edward M. Fisher
Attorney

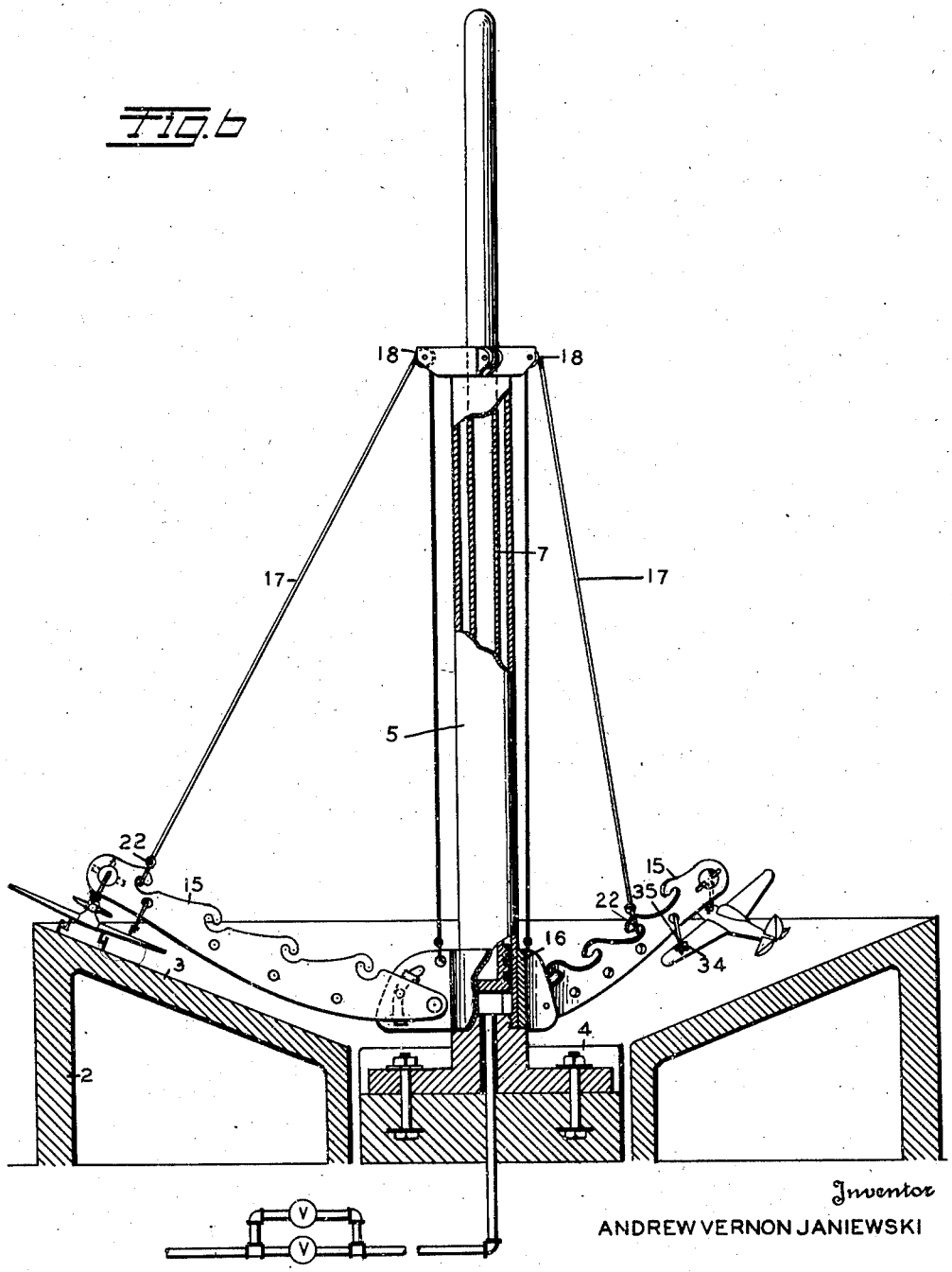

Patented Oct. 22, 1946

2,409,763

UNITED STATES PATENT OFFICE 2,409,763

AIRCRAFT LAUNCHING MEANS

Andrew Vernon Janiewski, Sebring, Fla.

Application May 7, 1945, Serial No. 592,471

4 Claims. (Cl. 244—63)

This invention is concerned with the provision of an aircraft launching means, whereby, military or civilian aircraft may be launched from secluded nooks about cities, islands, forests, on waterways and vessels et cetera, and wherein the theory of performance is that of flight theory, wherein, the forces of gravity during flight are overcome with the assistance of hydraulic pressure, plus power derived from self propelled aircraft, as in flight.

Broadly it is an object of this invention to provide a launching means for aircraft which consists generally of a circular banked base, a vertical column centrally disposed within said base, a piston operative within said column, said piston carrying a radial superstructure, hydraulic means for raising, lowering and rotating said piston and superstructure, load carrying arms, arranged for automatic angular adjustment in conformity to the slope of said base bank, carried by said superstructure, automatic means for leveling said arms when piston and superstructure is raised to a height, means for releasing aircraft from the said arms when same are leveled, and means for the lowering of said piston.

This invention resides substantially in the combination, construction, arrangement and relative location of parts, all in accordance with this disclosure.

In the accompanying drawings—

Figure 4 is a semi-vertical section of a modified form of this invention.

Figure 6 is a vertical sectional view of another modified form of this invention.

Figure 1:
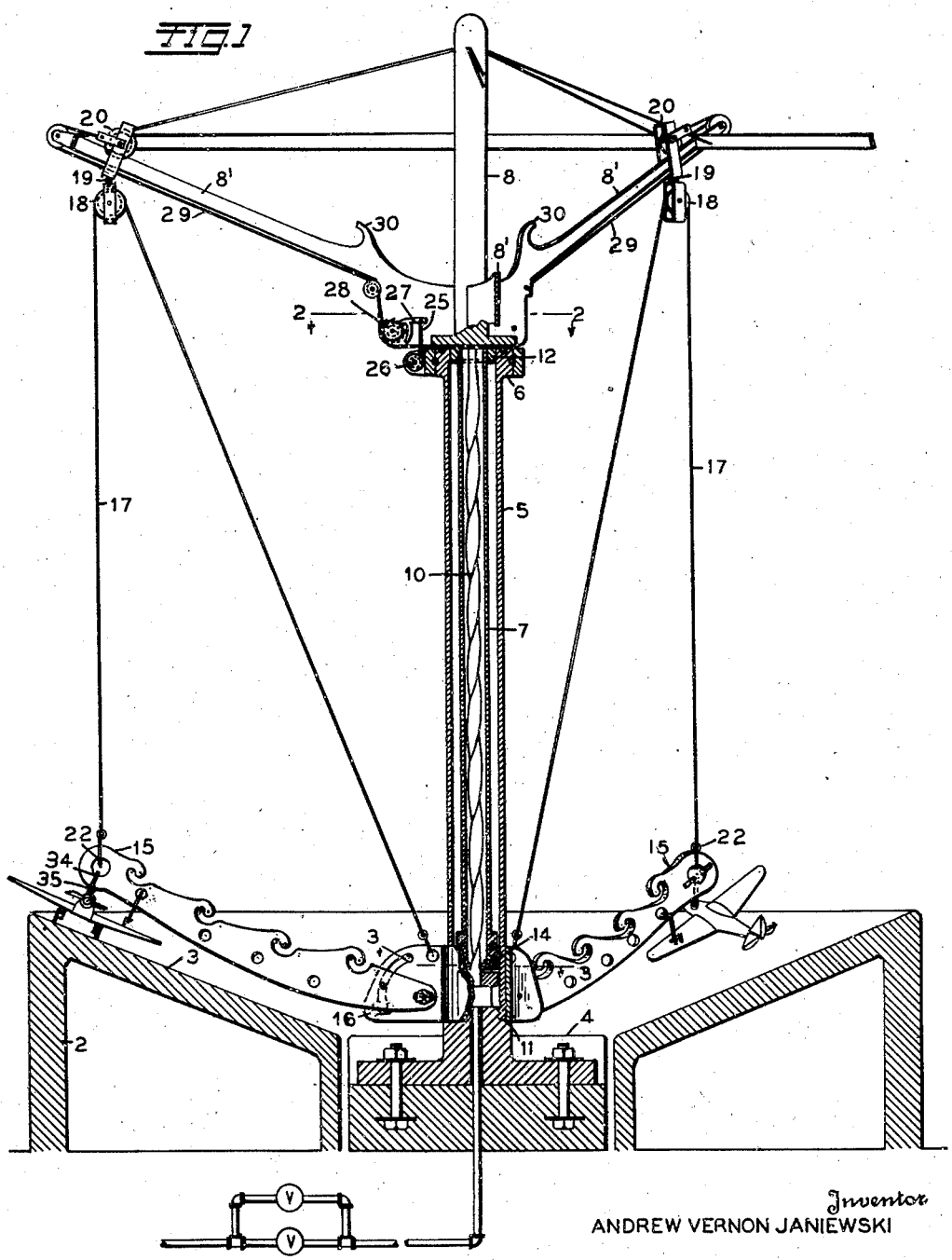
Figure 1 is a vertical sectional view of an aircraft launching means in accordance with this invention.
Figure 2:
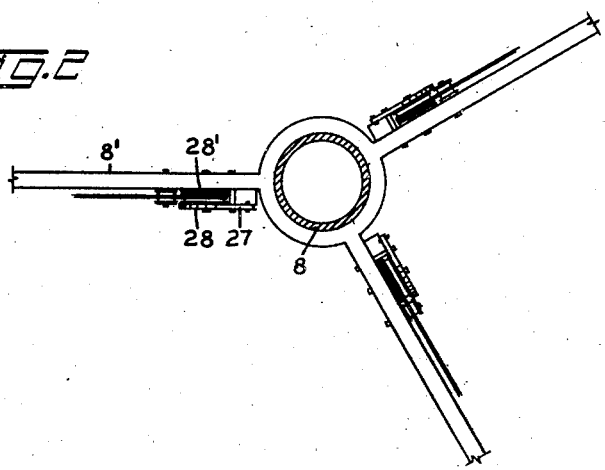
Figure 2 is a fragmentary section substantially on the line 2—2 Figure 1.

The true nature and manner of use of an aircraft launching means in accordance with this invention will be best understood by a detailed description of the form thereof shown in the drawings in an illustrative sense.

This launching means includes a circular base member 2 having banked or sloped sides 3, to give desired tilt to aircraft for a whirling take off, and a flat central portion 4 within which is a fixed centrally disposed vertical column 5 having at its uppermost end a collar 6. Fitted within said column 5 is a hydraulic actuated piston 7 said piston having a superstructure comprising a central column 8 with radial arms 8' extended outward therefrom, said arms having spaced divergence as to each other to aid in the balancing of load carrying mechanism, and while in the drawings there is shown a three arm structure this may be increased or decreased to any number so long as the balancing functions are maintained.

Figure 3:
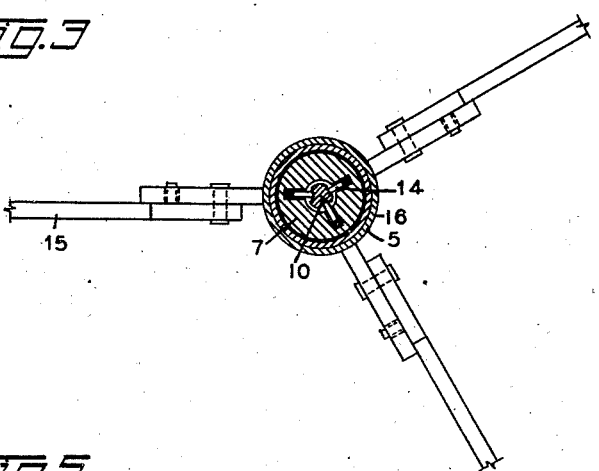
Figure 3 is a fragmentary section substantially on the line 3—3 Figure 1.
Figure 5:
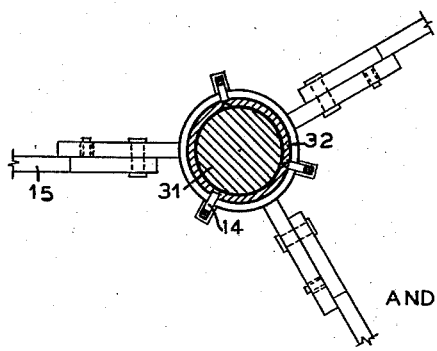
Figure 5 is a fragmentary section on line 5—5 Figure 4.

As the tubular piston is traveling thru its upper stroke it is desired that same be rotated to convey momentum to the aircraft carried thereby thru means hereinafter described, to this end there is centrally disposed within said tubular piston 7, a spiral member 10 which is in fixed engagement at its lower end with the base at 11, and maintained in free central relation to said piston, at its upper end, by a bushing 12. Rotary movement is effected to said piston thru the agency of a spiral by co-operative means in the form of spring actuated plungers 14 housed within said piston, extended inward therefrom, and engaged with said spiral so that as hydraulic pressure is exerted to the piston to raise same, said plungers are forced to follow the spiral path of the member 10 causing said piston to rotate during travel thereof. Said plungers are of a structure, as shown in Figure 3, permitting free rotation forward so as to allow self propelled aircraft having excelled forward thrust to enable build up forward speed free from spiral engagement.

Load carrying mechanism co-operating with the above defined structure includes load carrying arms 15 positioned below and in a vertical plane to the radial arms 8' and in pivotal engagement with the member 16 for vertical circular movement thereof to effect angular or horizontal carriage thereby, said member 16 being freely carried upon the outer periphery of the column 5 rotatable to enable said load carrying arms 15 to rotate in unison with the superstructure and radial arms thru means of cable and pulley mechanism comprising a cable 17, carried upon pulley wheel 18 of twin pulley 19, wheel 20 thereof being in free travel engagement upon said radial arms for positioning thereon, said cable being hooked at one end thereof to the load carrying arms as indicated at 22 the other end in hooked engagement with the lateral web portions of member 16.

In the use of this launching means the aircraft is rolled over a tramway or by any other suitable means placed upon the banked base and the load carrying arms releasably hooked thereto. As shown in Figures 1 and 4 the aircraft being on a bank; the carrying arms, to make contact therewith must be tipped at an upperward angle thereto. This adjustment positions the pulley 19 as shown in said figures. Hydraulic pressure is then exerted to the piston, which as above defined is rotated during travel thereof.

During travel of the piston upward a trigger cable 25, coiled within a spring coil chamber 26 and having an exposed end in engagement with a dog trigger 27, is extended, and in unison with the piston and superstructure reaching the limit of its upper stroke, said cable reaches the limit of its length causing a pull downward on the dog trigger releasing it from the ratchet wheel 28 thereby releasing the cable 29 which is rolled upon a drum 28' in fixed engagement with said ratchet wheel and permitting the pulley 19, to which said cable is engaged, to descend by gravity, upon the track formed by the radial arms to a stop member 30 thereby lowering the load carrying arm to a horizontal position for automatic take off, thereafter the hydraulic pressure is released, and as the piston and superstructure descends the cable is re-wound upon said drum returning the pulley 19 to starting position.

To provide a more durable structure for extra heavy craft, I provide a modified structure shown in Figure 4 wherein it will be observed that the only structural difference over that shown in Figure 1, is the removal of the spiral member from the center position to the piston and the placing of same upon the outer periphery of the column 31, plus the removal of the spiral engaging plungers from the piston and the establishment of same in the rotatable collar 32.

In combination with the above defined structures, suitable means is provided for adjustment, repairs et cetera of the superstructure in the form of a conventional platform held by dogs in engagement with the column and arranged to permit lowering of the piston and superstructure without lowering of said platform.

In Figure 6 is illustrated another modified form of structure in which all spiral mechanism is removed, therefore it is obvious that this structure is only suitable for self propelled aircraft, however aid is rendered said craft in a like manner to other defined structures to the extent of the upper travel of the piston under hydraulic pressure to give height to the aircraft as it gains momentum, and within the time said piston reaches the limit of its upper stroke the aircraft will have gained sufficient momentum so that under the law of centrifugal force the load carrying arms will level off and permit aircraft take off. In this structure it is also possible to start from a level position, in which case the carrier arms are in horizontal position. As the piston travels on its upper stroke the load carrying arms will be elevated according bank adjustments, thence the entire load carrying mechanism is carried upward. As the piston reaches its limit the collar 16 still has traveling space balanced with bank of the load carrying arms, thus as the speed increases the combination of forces, plus load leverage, forces said collar 16 upward, thus allowing load carrying arms to level and automatically, discharge load by forward centrifugal force.

Contact between the aircraft and load carrying arms is thru hook and eye engagement said hook 34 and eye 35 being arranged at an angle inward so that as centrifugal force carries the aircraft outward from the launching means release therefrom will be effected.

Adjustment in balancing of ship weight upon load carrying arms are obtained by the leverage adjustment from point of cable connection with arms and length of tension.

From the above description it will be apparent to those skilled in the art that the details of construction illustrated herein may readily be varied without departure from the novel subject matter herein disclosed, I do not, therefore, desire to be strictly limited by the disclosure but rather by the claims granted me.

What is claimed is:

1. A launching mechanism for an aircraft, comprising a substantially circular shaped bowl-like banking causeway for a whirling take-off by the craft when in contact therewith, an upstanding columnar standard at the center of the causeway, a superstructure carried by the standard and adapted for vertical and rotary movements above the said causeway, loading means rotatably mounted on the standard and underslung to the superstructure, radial load hanging arms adjustable angularly with respect to the causeway and pivotally connected to said loading means, radially disposed means flexibly connecting the arms and superstructure together, and traveling means on the superstructure and operatively connected with the flexible means, whereby under centrifugal action of the traveling means the load hanging arms are automatically angularly regulated about their pivotal connections during vertical and rotary movements of said superstructure.

2. A launching mechanism for an aircraft, comprising a substantially circular shaped bowl-like banking causeway for a whirling take-off by the craft when in contact therewith, an upstanding columnar standard at the center of the causeway, a superstructure carried by the standard and adapted for vertical and rotary movements above the said causeway, loading means rotatably mounted on the standard and underslung to the superstructure, radial load hanging arms adjustable angularly with respect to the causeway and pivotally connected to said loading means, radially disposed means flexibly connecting the arms and superstructure together, traveling means on the superstructure and operatively connected with the flexible means, whereby under centrifugal action of the traveling means the load hanging arms are automatically angularly regulated about their pivotal connections during vertical and rotary movements of said superstructure, and means on the superstructure to automatically effect radial action of the said traveling means.

3. A launching mechanism for an aircraft, comprising a substantially circular shaped bowl-like banking causeway for a whirling take-off by the craft when in contact therewith, an upstanding columnar standard at the center of the causeway, a superstructure carried by the standard and adapted for vertical and rotary movements above the said causeway, loading means rotatably mounted on the standard and underslung to the superstructure, radial load hanging arms adjustable angularly with respect to the causeway and pivotally connected to said loading means, radially disposed means flexibly connecting the arms and superstructure together, traveling means on the superstructure and operatively connected with the flexible means, whereby under centrifugal action of the traveling means the load hanging arms are automatically angularly regulated about their pivotal connections during vertical and rotary movements of said superstructure, means on the superstructure to automatically effect radial action of the said traveling means, and fluid pressure operated means acting on the superstructure to give vertical movements thereto.

4. A launching mechanism for an aircraft, comprising a substantially circular shaped bowl-like banking causeway for a whirling take-off by the craft when in contact therewith, an upstanding columnar standard at the center of the causeway, a superstructure carried by the standard and adapted for vertcial and rotary movements above the said causeway, loading means rotatably mounted on the standard and underslung to the superstructure, radial load hanging arms adjustable angularly with respect to the causeway and pivotally connected to said loading means, radially disposed means flexibly connecting the arms and superstructure together, traveling means on the superstructure and operatively connected with the flexible means, whereby under centrifugal action of the traveling means the load hanging arms are automatically angularly regulated about their pivotal connections during vertical and rotary movements of said superstructure, means on the superstructure to automatically effect radial action of the said traveling means, fluid pressure operated means acting on the superstructure to give vertical movements thereto, and means included in said fluid pressure operated means for the positive rotation of the superstructure.

ANDREW VERNON JANIEWSKI.